United States Patent [19]

Aterianus

[11] 3,866,738
[45] Feb. 18, 1975

[54] ARTICLE TRANSFER MECHANISM
[75] Inventor: John S. Aterianus, Green Bay, Wis.
[73] Assignee: FMC Corporation, San Jose, Calif.
[22] Filed: Sept. 21, 1973
[21] Appl. No.: 399,572

[52] U.S. Cl..................... 198/27, 198/32, 198/147
[51] Int. Cl............................................ B65g 47/38
[58] Field of Search .......... 198/20, 28, 31, 32, 145, 198/147, 152, 155, 158, 177, 27, 238, 240

[56] References Cited
UNITED STATES PATENTS

| | | | |
|---|---|---|---|
| 2,319,908 | 5/1943 | Walter | 198/31 R |
| 2,546,951 | 3/1951 | Petrilli | 198/20 |
| 2,704,177 | 3/1955 | Neaves | 198/155 |
| 2,765,067 | 9/1956 | Andrews | 198/147 |
| 3,232,411 | 2/1966 | Kulig | 198/32 |
| 3,233,721 | 2/1966 | Redden | 198/145 |
| 3,235,101 | 2/1966 | Milhaupt | 198/31 R |
| 3,429,416 | 2/1969 | Provost et al. | 198/20 |
| 3,458,970 | 8/1969 | Reid et al. | 198/31 R |
| 3,511,359 | 5/1970 | Gerisch | 198/28 |
| 3,633,728 | 1/1972 | Chamberlin | 198/32 |

Primary Examiner—James B. Marbert
Assistant Examiner—Richard K. Thomson
Attorney, Agent, or Firm—A. J. Moore; C. E. Tripp

[57] ABSTRACT

A mechanism for rapidly transferring and changing the spacing of easily damaged articles between a multi-lane input conveyor and a single lane output conveyor. The mechanism includes a pair of diverging transfer conveyors with evenly spaced article receiving buckets pivoted thereon. Guide rails support the buckets of both transfer conveyors in upwardly inclined positions when receiving articles from the input conveyor and permit the buckets to move to a downwardly inclined position to dump an article from each transfer conveyor into the single lane output conveyor at a spacing different from the spacing of the articles on the input conveyor. In the event the drive to a wrapping machine and the output conveyor is interrupted, auxiliary drive means is provided to continue driving the input and transfer conveyor, and pivoted rail segments are provided to prevent dumping of the articles from the buckets onto the output conveyor.

12 Claims, 13 Drawing Figures

FIG_1

FIG_5

FIG_6

FIG_7

FIG_8

FIG_9

ARTICLE TRANSFER MECHANISM

CROSS-REFERENCE TO RELATED APPLICATION

The multi-lane input conveyor referred to herein may be of the type associated with the frozen confection machine disclosed in United States Betschart et al. application Ser. No. 211,267 filed on Dec. 23, 1971 now U.S. Pat. No. 763,661 and assigned to the assignee of the present invention.

BACKGROUND OF THE INVENTION

1. Field of the Invention

This invention pertains to article transfer mechanisms and more particularly relates to a mechanism for transferring and changing the spacing of articles from a multi-lane input conveyor to a single lane output conveyor.

2. Description of the Prior Art

When transferring articles, such as chocolate coated ice cream bars, from a multi-lane frozen confection or ice cream machine to a continuously driven single lane conveyor of a wrapping machine, many problems existed with prior art devices. In many prior art devices a single transfer conveyor was used and the speed of such conveyor was limited to a maximum of about 160 bars per minute because of excessive acceleration damage to chocolate coated bars. Also, excessive damage occurred to the chocolate coating in these prior art devices when the ice cream was transferred from the multi-lane input conveyor to the buckets of the transfer conveyor, and again when the bars were transferred, one at a time, from the buckets to the single lane output or wrapping conveyor. Furthermore, on many of the transfer mechanisms no provision was made to divert the frozen confection or ice cream bars in the event the wrapping components of the wrapping machine and the output or wrapping conveyor were stopped.

SUMMARY OF THE INVENTION

The article transfer mechanism of the present invention includes a pair of intermittently driven transfer conveyors which diverge from the intermittently driven multi-lane input conveyor toward the continuously driven single lane output conveyor or wrapping conveyor to space the single lane of articles a predetermined distance apart as required by the wrapping machine. A plurality of evenly spaced article receiving buckets are pivotally mounted on each transfer conveyor from an upwardly inclined article receiving position at the input or feed station below the multi-lane input conveyor, to a downwardly inclined dumping position above the wrapping conveyor. One of the transfer conveyors receives articles from one half of the lanes of the input conveyor when the input conveyor is still moving, while the other transfer conveyor receives the articles in the remaining half of the lanes, after several indexing of the input conveyor, and also shortly before the termination of an indexing motion. The inclination of each bucket on each conveyor is controlled by a guide rail which includes a pivoted bypass portion at the dump station, which pivoted portion is normally lowered allowing the buckets to dump their articles into the continuously driven wrapping conveyor. However, in the event the wrapping components of the wrapping machine and the wrapping conveyor are not operating, the pivoted rail segment associated with each transfer conveyor may be raised to prevent dumping of the articles on the wrapping conveyor thereby allowing the articles to be dumped from the buckets at an alternate station for collection in any suitable manner. The buckets are provided with upstanding side walls and a lower end wall, and with a shallow V-shaped base. The base engages one of the flat side walls of the ice cream or frozen confection bar to prevent sticking or freezing, and the lower edges of the side walls are relieved to allow chocolate chips or the like to fall out of the buckets.

It is, therefore, one object of the present invention to provide an improved mechanism for transferring easily damaged articles at high speeds between a multi-lane input conveyor and a single lane output conveyor while changing the spacing of the articles.

Another object is to provide means for diverting the output of the articles when the output conveyor is not operating for an extended period.

Another object is to provide an improved article carrying bucket for supporting and dumping easily damaged frozen articles.

Another object is to provide means for releasing the articles from the input conveyor while the conveyor is moving thereby causing one of the large flat side walls of the article to contact and absorb most of the impact which occurs during transfer of the articles into the buckets.

BRIEF DESCRIPTION OF THE DRAWINGS

FIG. 1 is a diagrammatic perspective illustrating the mechanism for transferring transverse rows of articles from a multi-lane input conveyor onto a single lane output conveyor of a wrapping machine or the like.

DESCRIPTION OF THE PREFERRED EMODIMENT

Although the preferred embodiment of the article transfer mechanism 20 (FIGS. 1–3) of the present invention is intended for use in transferring articles A such as frozen ice cream or confection bars mounted on sticks S, and the description to follow will at times refer to ice cream bars, it will be understood that other articles may be handled by the transfer mechanism 20.

Figure 1:
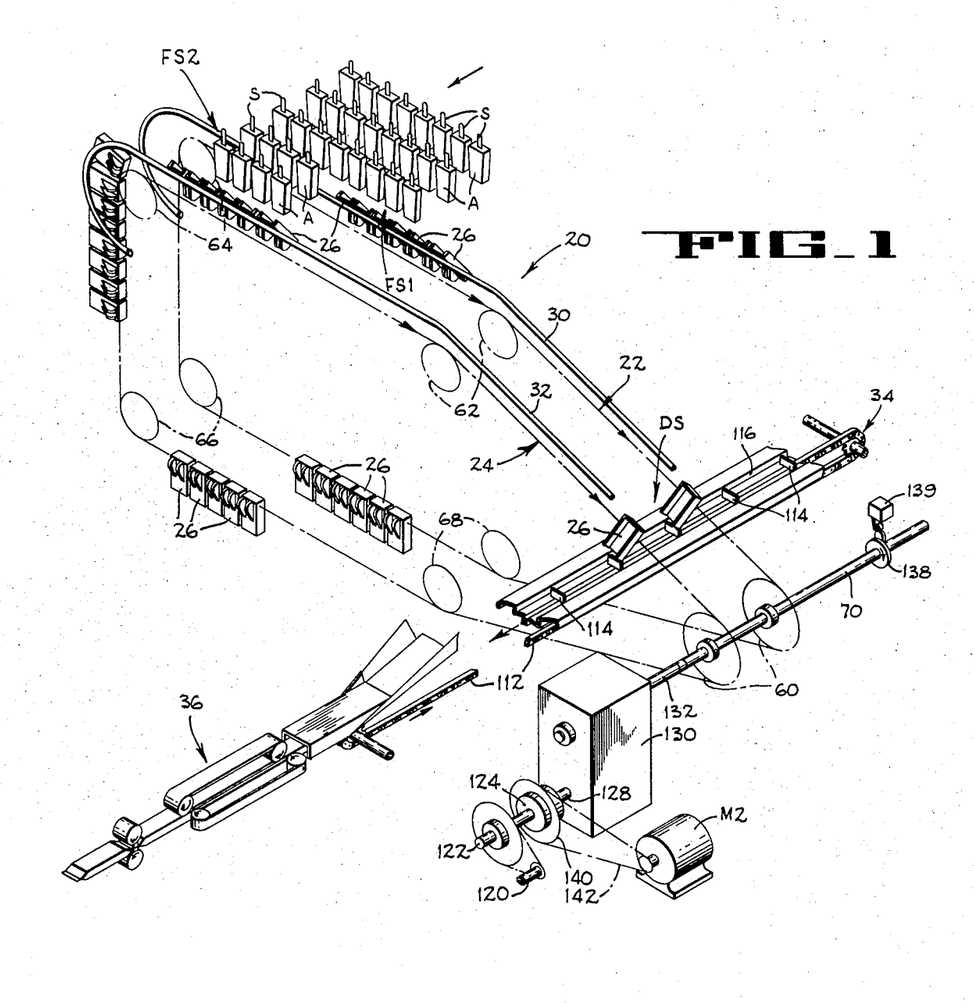

In general, the transfer mechanism 20 includes a pair of intermittently driven diverging transfer conveyors 22 and 24 each carrying a plurality of spaced article carrying buckets 26 pivotally attached to the conveyor. Transverse rows of ice cream bars or articles A are suspended by their sticks S from an intermittently driven, multi-lane inlet conveyor 28 of frozen confection machine. Half of the articles in each transverse row are released at a feed station FS1 into the buckets 26 of the transfer conveyor 22 while the other half of the articles in the transverse rows are released into the buckets of transfer conveyor 24 several indexing steps later at feed station FS2 as illustrated in FIG. 1. Guide rails 30 and 32 maintain the buckets 26 in an outwardly inclined article receiving position until the buckets reach a discharge station DS at which time they move off the end of rails 30, 32 and dump the ice cream bars A, with their sticks foremost, into evenly spaced flights of a continuously driven single lane output or wrapping conveyor 34 of a wrapping machine 36 (only a fragment of the wrapping machine being diagrammatically illustrated in FIG. 1).

Figures 3, 4:
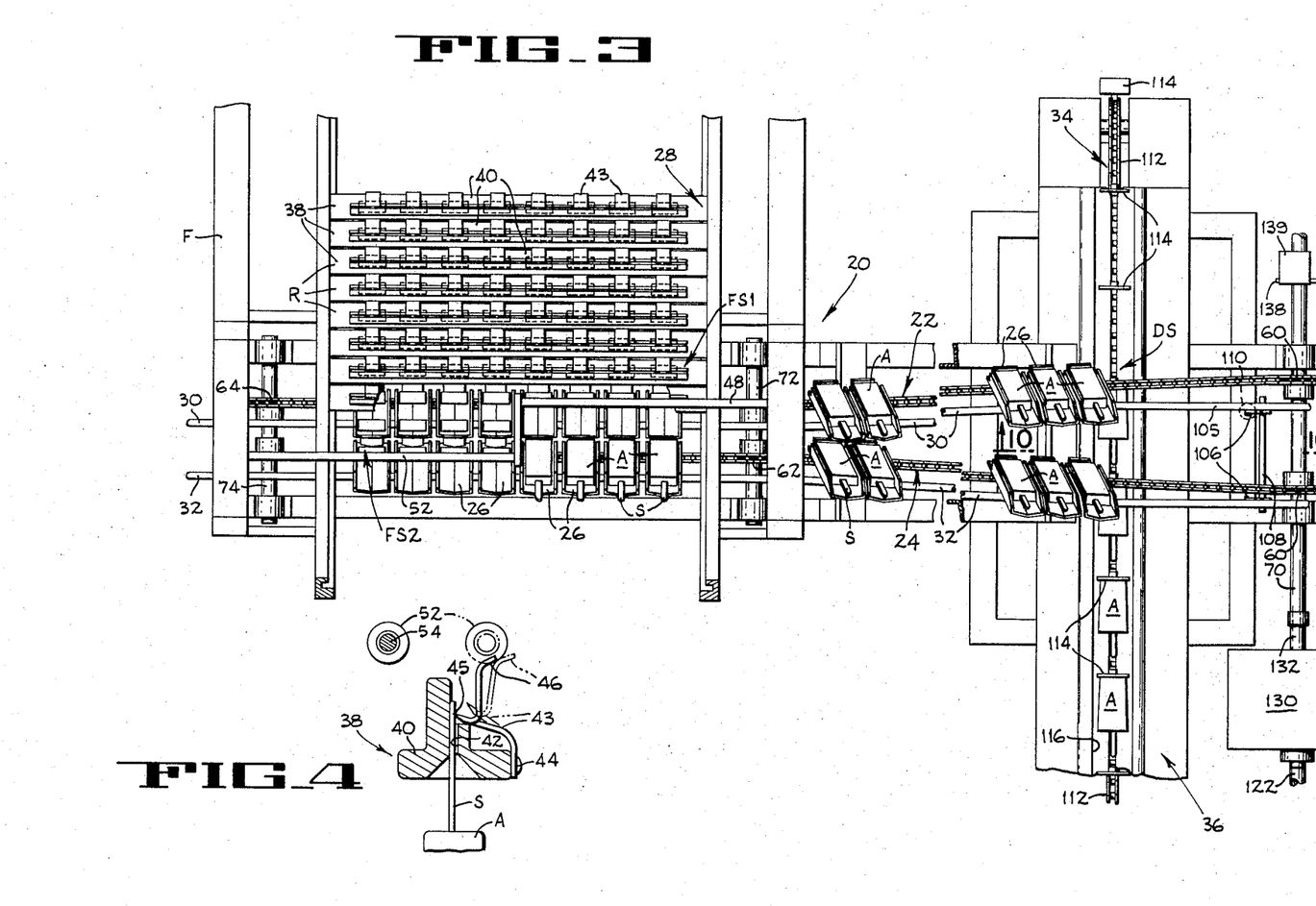
FIG. 3 is a plan of the mechanism illustrated in FIG. 2, certain parts being broken away.
FIG. 4 is an enlarged vertical section taken along lines 4—4 of FIG. 2 illustrating in solid lines a clamping device for engaging the sticks of confection such as frozen ice cream bars, and illustrating in dotted lines the clamp as it appears when releasing a stick.
Figure 5:
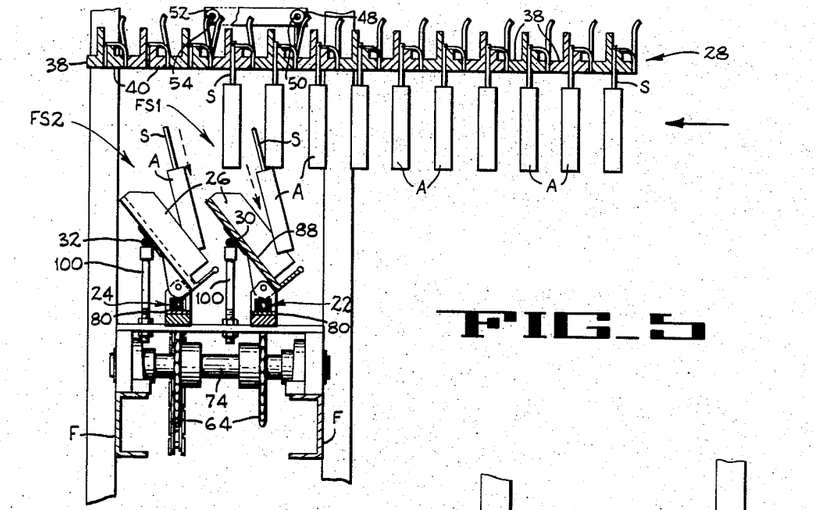
FIG. 5 is an enlarged section taken along lines 5—5 of FIG. 2 illustrating ice cream bars falling into the buckets of two transfer conveyors after the bars have been released from the traveling input conveyor.
Figure 6:
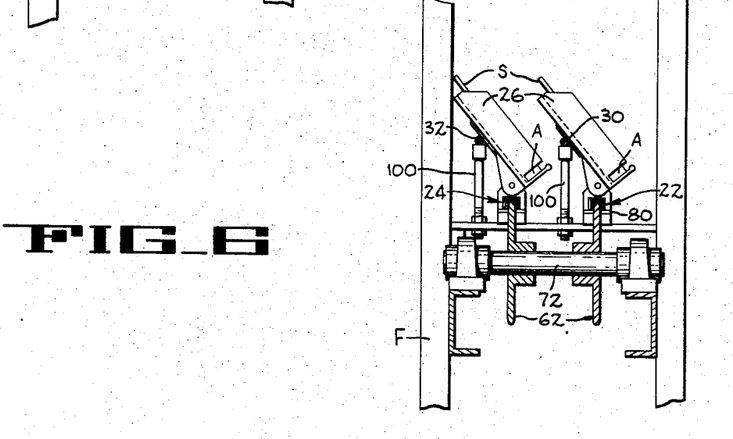
FIG. 6 is a section taken along line 6—6 of FIG. 2 illustrating the ice cream bars seated in their pivotal buckets with the buckets being held in their upwardly inclined article receiving positions by guide rails.
Figure 7:
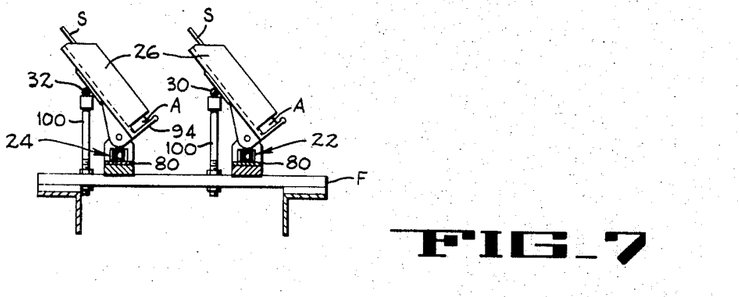
FIG. 7 is a section similar to FIG. 6 but taken along line 7—7 of FIG. 2 illustrating the buckets when moving down an incline portion of the rails.

More particularly, the inlet conveyor 28 includes a plurality of flights 38 (FIGS. 3, 4 and 5) each including article receiving transverse bars 40 (FIG. 4) having slots 42 therein for receiving the sticks S of the frozen ice cream bars or articles A. The sticks are held in the bars 40 by resilient clamps 43 each having one end 44 (FIG. 4) anchored to the associated bar, a sharpened stick gripping edge 45, and an upper clamp releasing end portion 46. As illustrated in FIGS. 3 and 5, the four right hand (FIG. 3) articles in each row R are released from the inlet conveyor 28 over the transfer conveyor 22 by engagement of the associated clamp portion 46 with a clamp opening roller 48 journaled on a rod 50 (FIG. 5). After several indexing movements of the inlet conveyor 28, preferably two indexing movements, the remaining articles in that row R are released from the input conveyor 28 into the transfer conveyor 24 by engagement of the upper end portions 46 of the remaining half of the resilient clamps 43 with a roller 52 mounted on a rod 54 as clearly illustrated in FIG. 4. The rods 50 and 54 are rigidly secured to the frame F of the machine.

An important feature of the invention is that the rollers 48 and 52 are positioned so that the articles are released while the inlet conveyor 28 is moving. By releasing the articles A when the articles and inlet conveyors are moving, the articles do not fall straight down but instead fall in a curved path with the upper end moving faster than the lower end somewhat as indicated in FIG. 5. In this way, the impact forces due to transfer of the articles into the buckets 26 at the feed stations FS1 and FS2 is primarily absorbed on the wide forward side surface of the articles. Thus, if the articles A are chocolate covered ice cream bars, there is much less chance of the chocolate chipping off the bars as would occur if the bars landed entirely on their narrow lower ends.

The transfer conveyors 22 and 24 (FIGS. 1–3) include spaced parallel portions which extend through the feed stations FS1 and FS2 and thereafter diverge from each other to provide a desired predetermined spacing at the discharge station DS which is different from the spacing at the feed stations. The transfer conveyors extend transversely of the inlet conveyor 28 and output or wrapping conveyor 34. Each conveyor 22, 24 is substantially the same and each is trained around an associated drive sprocket 60 and idler sprocket 62, 64, 66 and 68 secured to the drive shaft 70 and idler shafts 72, 74, 76 and 78, respectively, which shafts are journaled on the frame F. The upper run of each of the conveyors 22 and 24 are slidably supported on guide rails 80 (FIGS. 2 and 8), each of which includes a horizontal portion and a downwardly inclined portion secured to frame F.

Figure 8:
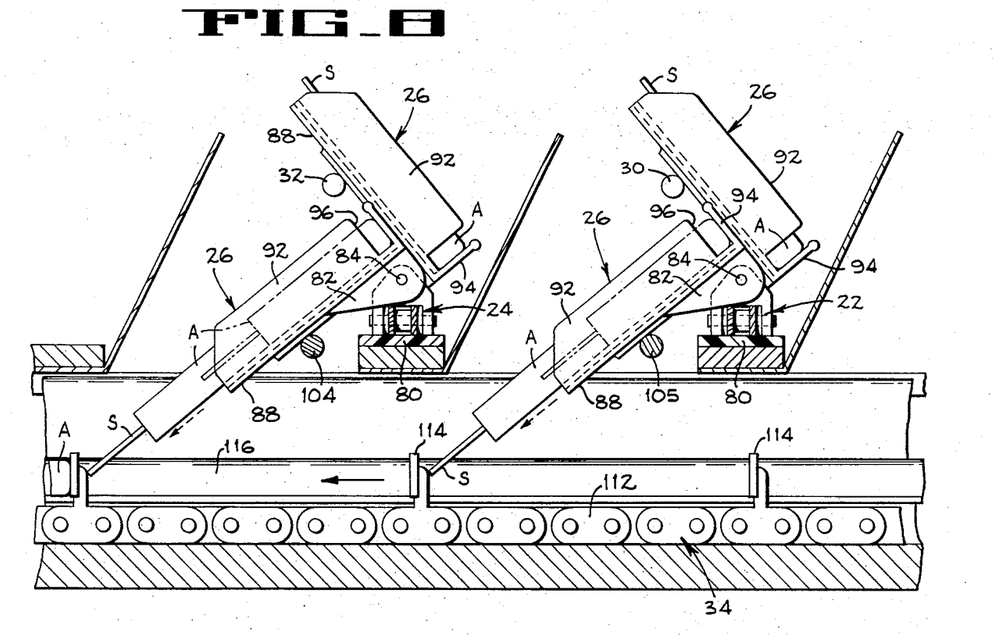
FIG. 8 is an enlarged section taken along lines 8—8 of FIG. 2 illustrating one bucket of each transfer conveyor as it appears immediately before being dumped, and illustrating another bucket of each conveyor as it is dumping an article into the output or wrapping conveyor.
Figure 12:
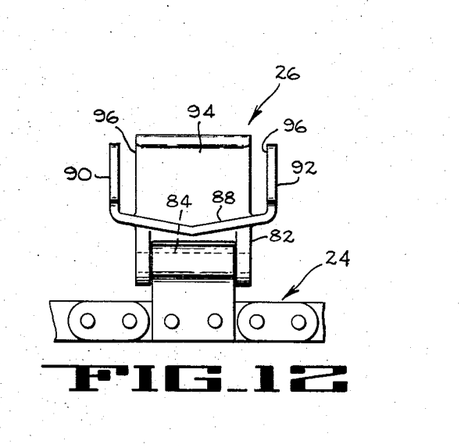
FIG. 12 is an end view of the bucket of FIG. 11 looking in the direction of arrows 12—12.

As best shown in FIGS. 8 and 10–12, each bucket 26 is pivotally connected to the chain of the associated transfer conveyor 22, 24 by a yoke 82 and pivot pin 84 (FIGS. 8 and 12). Each bucket 26 includes a V-shaped base 88 (FIGS. 10–12), upstanding side walls 90 and 92 and an upstanding end wall 94. The V-shaped base minimizes sticking of the confection to the bucket, and slots 96 are provided between each side wall and end wall to allow debris, such as chocolate chipped off the articles, to gravitate from the bucket.

Figure 2:
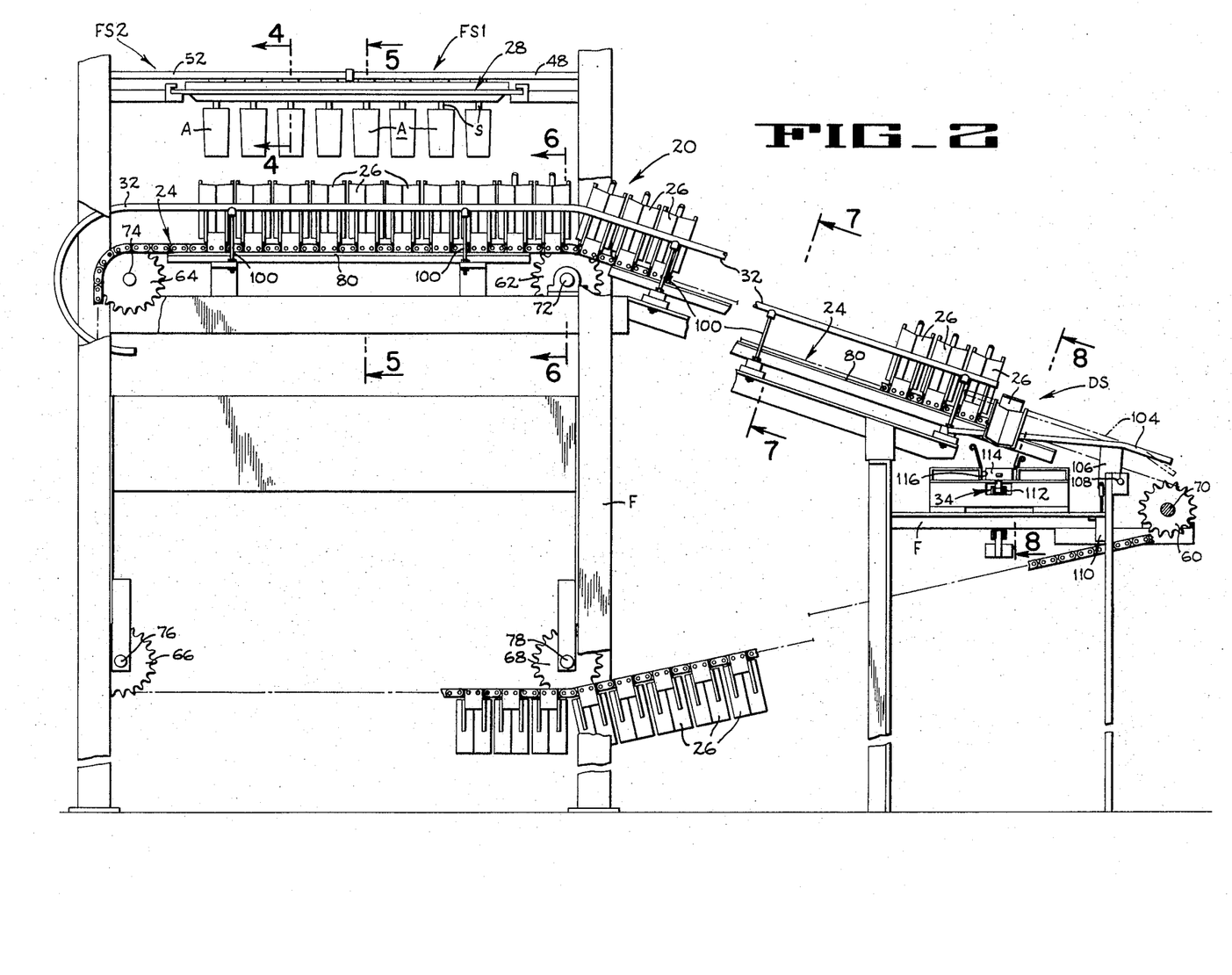
FIG. 2 is an enlarged side elevation of FIG. 1 with parts broken away.

The buckets 26 of the conveyors 22, 24 are held in an upwardly inclined attitude from the feed stations FS1 and FS2 to a point adjacent the discharge station DS by guide rails 30 and 32. Each guide rail 30, 32 is welded to bolts 100 secured to the frame F at spaced intervals as best shown in FIG. 2 thus providing a certain amount of resilience to the rails, which resilience minimizes damage to the articles as the articles are dropped into the buckets 26. It will be apparent from FIG. 8 that movement of the buckets 26 off the ends 102 of rails 30, 32 at the discharge station DS will cause the buckets to move to a downwardly inclined position thereby dumping the articles onto the output conveyor 34.

Figure 9:
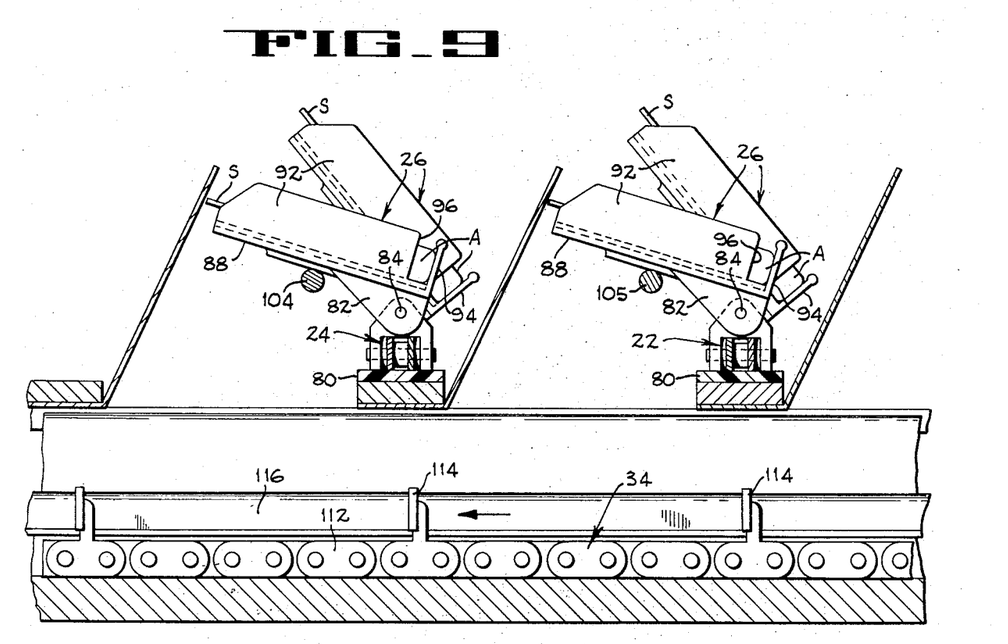
FIG. 9 is a section similar to FIG. 8 but illustrating bypass rail sections pivoted into their bypass positions to prevent dumping of the buckets when the output conveyor is not operating.
Figures 10, 13:
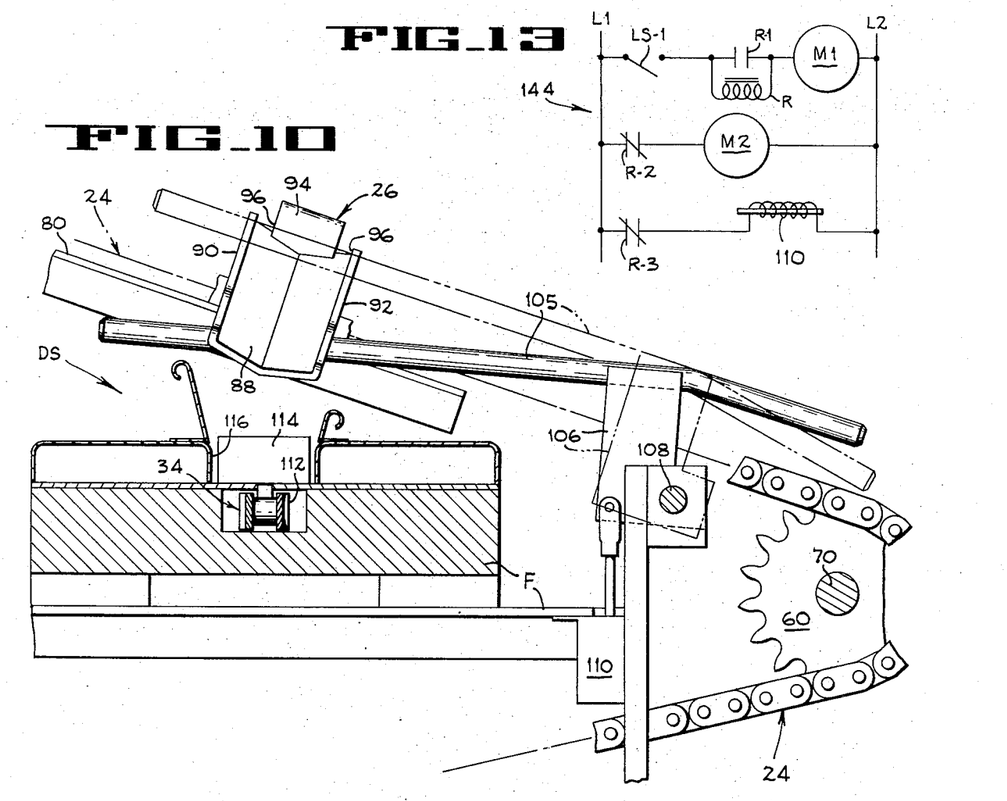
FIG. 10 is an enlarged vertical section taken along lines 10—10 of FIG. 3 showing one of the buckets in position to dump an article into the output conveyor.
FIG. 13 is a wiring diagram illustrating a circuit for controlling a bypass solenoid and an auxiliary motor which drives the transfer conveyor when the wrapping machine and its wrapping conveyor are down.
Figure 11:
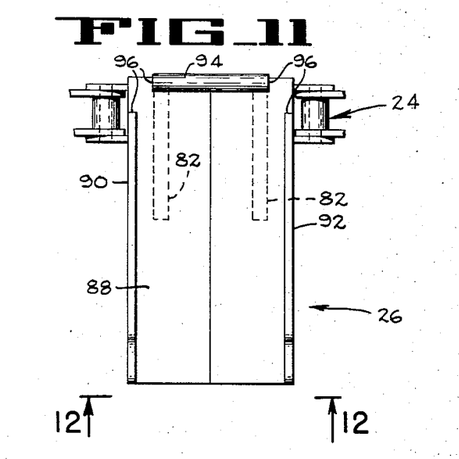
FIG. 11 is an enlarged plan of one of the buckets.

In the event the wrapping components of the wrapping machine 36 and the wrapping or output conveyor 34 are stopped, pivoted bypass guide rail segments 104, 105 (FIGS. 2, 3 and 10) are provided to prevent dumping of articles into the output conveyor 34. Each rail segment 104, 105 is supported by brackets 106 on a pivot shaft 108 journaled on the frame. The rail segments 104, 105 are pivoted from their normal lowered position shown in solid lines in FIGS. 1 and 10 to their bypass position shown in dotted lines by a solenoid 110 pivotally connected between the frame F and one of the brackets 106. Thus, when the wrapping components of the wrapping machine and the output conveyor 34 are operating in their normal manner the rail segments 104, 105 will remain in their lower positions as illustrated in FIGS. 8 and 10 thereby dumping the articles A from their buckets 26 onto the output conveyor 34. However, if the wrapping components and output conveyor are not operating in their normal fashion but have stopped, then the solenoid 110 is energized causing the rails to move to their uppermost positions as shown in dotted lines in FIGS. 2 and 10 thus maintaining the buckets 26 in an upwardly inclined position preventing articles from being discharged therefrom as shown in FIG. 9. The article thus move past the output conveyor 34 and are separately discharged from the bucket 26 onto any suitable means as the buckets move off the rail segments around the drive sprockets 60.

As mentioned previously, the single lane output conveyor 34 is a part of the wrapping machine and is continuously driven by the wrapping machine drive for feeding articles into the wrapping machine 34 (FIG. 1). As shown in FIGS. 1, 3 and 9, the output conveyor includes an endless chain 112 having pusher bars 114 secured thereto at evenly spaced intervals. The pusher bars 114 ride within a trough 116 rigidly secured to the frame F. The pusher bars slidably advance articles A deposited in the trough 116 into the wrapping components of the wrapping machine.

As diagrammatically illustrated in FIG. 1, the transfer conveyors 22 and 24 are normally driven from a drive shaft 120 of the wrapping machine, which shaft is continuously driven by a drive motor M1 (FIG. 13) of the wrapping machine when the wrapping machine is in normal operation. The drive shaft 120 is connected to an input shaft 122 of a single position clutch 124 which provides power to an indexing drive 130 having an intermittently driven output shaft 132 coupled to the drive shaft 70 of the transfer conveyors 22 and 24. The input conveyor 28 is intermittently driven by its own motor (not shown) and is timed relative to the movement of the transfer conveyors 22, 24 with the aid of a cam 138 on shaft 70 and a switch 139.

As mentioned previously, if the wrapping machine including the wrapping conveyor 34 momentarily stops, it is desirable to continue operation of the transfer conveyors 22, 24. In this regard, the articles A, especially if they are frozen confection bars, are advanced out of the buckets 26 of the transfer conveyors 22 and 24 for separate collection. For this purpose the auxiliary motor M2 is connected to a clutch control sprocket 140 by a chain drive 142. The clutch control sprocket 140 may be an overriding ratchet type which does not rotate when the transfer conveyors 22, 24 are driven from the shaft 120 of the wrapping machine, but drive the clutch output shaft 128 upon termination of movement of the input shaft 120 and energization of the auxiliary motor M2.

Any suitable electric circuit 144 (FIG. 13) may be provided for starting the motor M2 and simultaneously energizing the bypass solenoid 110. Such a circuit may receive power from main line L1 and L2. The motor M1 of the wrapping machine is connected in series with at least one limit switch LS-1 which switch opens in the event some condition in the wrapping machine 36 indicates that the motor M1 should stop. Relay R is connected in the line to motor M1 across relay contact R-1, which relay R is energized and contact R-1 is closed when power is directed to motor M1. Relay contact R-2 is connected in series between lines L1 and L2 with auxiliary motor M2. Likewise, relay contact R-3 is connected in series with bypass solenoid 110.

Thus, opening of limit switch LS1 de-energizes wrapper motor M1 and relay R thus closing contacts R-2 and R-3 simultaneously, energizing auxiliary motor M2 and bypass solenoid 110. In this way the transfer conveyors 22, 24 continue to be driven until articles A thereon are removed therefrom by being discharged into suitable take-away means (not shown).

It will be appreciated that the timing of the intermittently driven conveyors of the preferred embodiment of the article transfer mechanism of the present invention is such that the transfer conveyors 22, 24 index four times for each indexing movement of the inlet conveyor 28.

From the foregoing description it is apparent that the transfer mechanism of the present invention includes a pair of diverging transfer conveyors which receive spaced articles, such as frozen confection bars, from a multi-lane output conveyor in single file and at a different spacing than the spacing of the inlet conveyor. The transfer mechanism also includes article carry buckets which receive the articles on their flat sides when inclined upwardly, and thereafter pivot downwardly for simultaneously dumping their articles at evenly spaced intervals onto the output conveyor. The mechanism also includes a bypass system and auxiliary drive motor which cause discharge of the articles from the buckets at points spaced from the discharge station in the event the wrapping machine is momentarily stopped.

Although the best mode contemplated for carrying out the present invention has been herein shown and described, it will be apparent that modification and variation may be made without departing from what is regarded to be the subject matter of the invention.

What I claim is:

1. An apparatus for transferring elongated articles having longitudinal axes and predetermined lengths at high speed from a multi-lane driven inlet conveyor which supports the articles with their longitudinal axes vertical and spaced apart a distance less than the length of the articles to a single lane output conveyor with the longitudinal axes being horizontal and the spacing between articles being greater than the length of the articles comprising, a pair of spaced transfer conveyors disposed transversely of the inlet and outlet conveyors, means for effecting transfer of articles from a predetermined plurality of lanes of multi-lane inlet conveyor into one of said transfer conveyors and for effecting transfer of the articles from other predetermined lanes of the inlet conveyor into the other transfer conveyor, means on said transfer conveyors for supporting and shifting the articles from a vertical to a horizontal position and advancing the articles until the articles are aligned with said single lane output conveyor, means for simultaneously transferring one article from each transfer conveyor into the single lane output conveyor, and drive means for driving each of said conveyors in timed relation.

2. An apparatus according to claim 1 wherein said transfer conveyors diverge outwardly from a spacing less than the predetermined article length at said multi-lane conveyor to a spacing greater than the article length at said single lane conveyor for spacing the articles on said single lane conveyor a distance apart greater than the predetermined article length.

3. An apparatus according to claim 1 wherein the multi-lane conveyor includes a plurality of transverse rows of clamp means and wherein the articles are gripped by said clamp means and hang downwardly therefrom, and means for simultaneously releasing said clamp means of one row in said predetermined plurality of lanes for discharging the supported articles in said one transfer conveyor, and for simultaneously releasing said clamp means in said row from said other predetermined lanes for discharging the supported articles in said other transfer conveyor.

4. An apparatus for transferring articles at high speed from a multi-lane intermittently driven inlet conveyor to a single lane output conveyor comprising: a pair of spaced transfer conveyors disposed transversely of the inlet and outlet conveyors; means for effecting transfer of articles from a plurality of the lanes of the multi-lane inlet conveyor into one of said transfer conveyors and for effecting transfer of the articles from other lanes of the inlet conveyor into the other transfer conveyor; means for supporting the articles on said transfer conveyors until said articles are aligned with asid single lane output conveyor; means for simultaneously transferring one article from each transfer conveyor into the single lane output conveyor; and drive means for driving each of said conveyors in timed relation; said transfer conveyors each including a plurality of evenly spaced pivotally mounted article receiving buckets, said article supporting means including a guide rail for each transfer conveyor terminating adjacent the output conveyor, each guide rail being positioned to support the buckets of the associated transfer conveyor in an upwardly inclined article supporting position and for allowing said buckets to pivot to a downwardly inclined article dumping position when advanced off the end of said associated guide rails for dumping the articles into said output conveyor.

5. An apparatus according to claim 4 wherein said single lane output conveyor feeds the articles into a driven wrapping machine, and additionally comprising bypass means responsive to the interruption of the normal operation of the wrapping machine for preventing dumping of the articles into the single lane output conveyor.

6. An apparatus according to claim 5 wherein said bypass means comprises a pair of pivotally mounted rail segments movable between a lowered position wherein said buckets dump their articles into said output conveyor, and a raised bypass position wherein said rail segments preclude dumping of the articles from said buckets into said output conveyor.

7. An apparatus according to claim 6 wherein said drive means normally receives its power from said driven wrapping machine, and additionally comprising auxiliary drive means responsive to the interruption of the operation of the wrapping machine for driving said transfer conveyors.

8. An apparatus according to claim 4 wherein said guide rails are resiliently mounted for reducing impact forces during transfer of articles from the inlet conveyor into said buckets.

9. An apparatus according to claim 4 wherein said transfer conveyors and said rails diverge outwardly from said multi-lane conveyor toward said single lane conveyor for spacing the articles on said single lane conveyor at a spacing which is different from the spacing of the articles on said multi-lane conveyor.

10. An apparatus for transferring articles at high speed from a multi-lane intermittently driven inlet conveyor to a single lane output conveyor comprising; a pair of spaced transfer conveyors disposed transversely of the inlet and outlet conveyors; means for effecting transfer of articles from a plurality of the lanes of the multi-lane inlet conveyor into one of said transfer conveyors and for effecting transfer of the articles from other lanes of the inlet conveyor into the other transfer conveyor; means for supporting the articles on said transfer conveyors until said articles are aligned with said single lane output conveyor; means for simultaneously transferring one article from each transfer conveyor into the single lane output conveyor; and drive means for driving each of said conveyors in timed relation; said transfer conveyors each including a plurality of evenly spaced pivotally mounted article receiving buckets, each bucket comprising a V-shaped base, a pair of upstanding side walls rigid with said base, and an upstanding end wall rigid with said base and spaced from said side walls to define slots through which debris may gravitate.

11. An apparatus according to claim 10 wherein the articles include a relatively wide, flat side surface and hang from said inlet conveyor, wherein said V-shaped base of each upwardly inclined bucket is facing the articles carried by said intermittently driven multi-lane inlet conveyor, and wherein said transfer means releases the articles while the inlet conveyor is moving causing the released articles to swing through an arc with said flat side surface landing on said V-shaped base.

12. An apparatus according to claim 11 wherein said transfer conveyors and said rails diverge outwardly from said multi-lane inlet conveyor toward said single lane output conveyor for spacing the articles on said single lane conveyor at a spacing different from the spacing of the articles on said multi-lane conveyor.

* * * * *

UNITED STATES PATENT OFFICE
CERTIFICATE OF CORRECTION

PATENT NO. : 3,866,738
DATED : February 18, 1975
INVENTOR(S) : JOHN S. ATERIANUS It is certified that error appears in the above-identified patent and that said Letters Patent are hereby corrected as shown below:

Column 1, line 9, "763,661" should be --3,763,661--.

Column 3, line 26, after "of" insert --a--.

Column 5, line 9, "article" should be --articles--.

Column 7, line 19, "asid" should be --said--.

Column 8, line 15, after "comprising" semi colon should be a colon.

Signed and Sealed this sixth Day of January 1976

[SEAL]

Attest:

RUTH C. MASON
*Attesting Officer*

C. MARSHALL DANN
*Commissioner of Patents and Trademarks*